(12) United States Patent
Boyce et al.

(10) Patent No.: US 10,560,681 B2
(45) Date of Patent: *Feb. 11, 2020

(54) STEREO LOGO INSERTION

(71) Applicant: INTERDIGITAL MADISON PATENT HOLDINGS, Paris (FR)

(72) Inventors: Jill M. Boyce, Portland, OR (US); Kumar Ramaswamy, Princeton, NJ (US); Joan Llach, Cesson-Sevigne (FR)

(73) Assignee: INTERDIGITAL MADISON PATENT HOLDINGS

( * ) Notice: Subject to any disclaimer, the term of this patent is extended or adjusted under 35 U.S.C. 154(b) by 0 days.

This patent is subject to a terminal disclaimer.

(21) Appl. No.: 15/860,655

(22) Filed: Jan. 2, 2018

(65) Prior Publication Data

US 2018/0192021 A1 Jul. 5, 2018

Related U.S. Application Data

(63) Continuation of application No. 13/579,670, filed as application No. PCT/US2010/000480 on Feb. 19, 2010, now Pat. No. 9,860,513.

(51) Int. Cl.
| | |
|---|---|
| *H04N 13/156* | (2018.01) |
| *H04N 13/183* | (2018.01) |
| *H04N 13/261* | (2018.01) |
| *H04N 13/293* | (2018.01) |

(52) U.S. Cl.
CPC ......... *H04N 13/156* (2018.05); *H04N 13/183* (2018.05); *H04N 13/261* (2018.05); *H04N 13/293* (2018.05)

(58) Field of Classification Search
CPC ......... H04N 13/0048; H04N 2213/007; H04N 13/0029; H04N 13/007; H04N 13/004
USPC ..................................................... 348/42–60
See application file for complete search history.

(56) References Cited

U.S. PATENT DOCUMENTS

| | | | |
|---|---|---|---|
| 2002/0071616 | A1 | 6/2002 | Yoshida |
| 2004/0008198 | A1 | 1/2004 | Gildred |
| 2007/0035618 | A1 | 2/2007 | Yoshida |
| 2009/0315979 | A1 | 12/2009 | Jung et al. |
| 2010/0021141 | A1 | 1/2010 | Yamashita |

FOREIGN PATENT DOCUMENTS

| | | |
|---|---|---|
| EP | 0659022 | 6/1995 |
| EP | 1024672 | 8/2000 |
| EP | 1744564 | 1/2007 |
| JP | 7222143 | 8/1995 |
| JP | 10257525 | 9/1998 |
| JP | 2001320710 | 11/2001 |
| JP | 2004201004 | 7/2004 |

(Continued)

*Primary Examiner* — Michael E Teitelbaum
(74) *Attorney, Agent, or Firm* — Lily Neff

(57) ABSTRACT

A method for inserting a logo into a stereo video image to generate an overlaid stereo image, the method comprising: detecting presence of stereo pictures in the video image and, when stereo pictures are detected, determining the 3D format of said stereo pictures, said 3D format being a stereo spatially multiplexed format; generating a stereo logo comprising stereo spatially multiplexed logo pictures including a representation of the logo, said stereo spatially multiplexed logo pictures being arranged in said 3D format; and combining the stereo logo and the video image to generate the overlaid stereo image in said 3D format.

10 Claims, 4 Drawing Sheets

Interlaced  Top-bottom  Side-by-side  Checkerboard

S1  S2

(56) References Cited

FOREIGN PATENT DOCUMENTS

| | | |
|---|---|---|
| JP | 2004274125 | 9/2004 |
| JP | 2005311983 | 11/2005 |
| JP | 2006332985 | 12/2006 |
| JP | 2010034704 | 2/2010 |
| KR | 827133 | 5/2008 |
| WO | WO2009157708 | 12/2009 |

STEREO LOGO INSERTION

This application is a continuation of U.S. application Ser. No. 13/579,670, filed Aug. 17, 2012, now U.S. Pat. No. 9,860,513 issued Jan. 2, 2018, which claims the benefit of PCT/US2010/000480 filed Feb. 19, 2010,herein incorporated by reference.

FIELD OF THE INVENTION

This invention relates to image processing and display systems, and more particularly, to a system and method for inserting an object such as a logo into video content and, more particularly, for inserting a logo onto stereo spatially interleaved three dimensional (3D) pictures.

BACKGROUND OF THE INVENTION

Logo insertion devices and techniques are widely available for commercial and non-commercial applications dealing exclusively with two dimensional (2D) images and video. In these applications, the source picture and a logo picture are input to a device which combines the inputs to form an output 2D picture. This output 2D picture includes the logo overlaid or blended with the source picture. Transparency, size, color, and position of the logo are generally parameters capable of being programmed to effect a change in the appearance of the logo in the output picture.

Logo insertion for 2D images is known to be performed on uncompressed video or on video in the compressed domain. In both cases, the logo insertion is typically accomplished without requiring decoding and re-encoding the image bit stream. For example, the Thomson Grass Valley Crystal Logo Inserter performs still and animated logo insertion directly in the MPEG-2 compressed video domain, thereby avoiding any decoding and re-encoding of the 2D signals. Other logo insertion products are commercially available for inserting a logo into a 2D image. In general, the logo picture is combined directly with the content picture so that the video output image frame includes the content with the logo properly placed thereon for 2D processing and display.

However, current commercially available logo insertion techniques and devices are not applicable for logo insertion into a stereo image, that is, a 3D image. That is, it has been determined that insertion of a logo into a 3D image by conventional logo insertion techniques will result in the presence of undesirable effects such as logo distortion and the like.

SUMMARY OF THE INVENTION

These and other deficiencies of the prior art are addressed by various embodiments of the present invention by providing a method for generating a stereo logo comprising stereo spatially interleaved logo pictures, each stereo spatially interleaved logo picture including a representation of the logo, wherein the stereo spatially interleaved logo pictures are arranged in the spatially interleaved format. When the video image is processed for logo insertion, it is subjected to detection for the presence of pictures in the video image, wherein the stereo spatially interleaved pictures for the video image are arranged in a spatially interleaved format. After the stereo logo is generated, it is combined with the video image to generate the overlaid image in the spatially interleaved format. The overlaid image is suitable for storage, display, or distribution.

In one embodiment of the present invention, a method for inserting a logo into a video image to generate an overlaid image includes detecting presence of stereo spatially interleaved pictures in the video image, the stereo spatially interleaved pictures for the video image being arranged in a spatially interleaved format, generating a stereo logo comprising stereo spatially interleaved logo pictures including a representation of the logo, the stereo spatially interleaved logo pictures arranged in the spatially interleaved format and combining the stereo logo and the video image to generate the overlaid image in the spatially interleaved format.

In an alternate embodiment of the present invention, the method can further include analyzing the video image to determine the spatially interleaved format by detecting at least one seam in said video image where the at least one seam can include a horizontal seam and where the spatially interleaved format includes one of a top-bottom format, an interlaced format, and a checkerboard format and further can include where the at least one seam includes a vertical seam and where the spatially interleaved format includes one of a side-by-side format, an interlaced format, and a checkerboard format.

BRIEF DESCRIPTION OF THE DRAWINGS

The teachings of the present invention can be readily understood by considering the following detailed description in conjunction with the accompanying drawings, in which.

It should be understood that the drawings are for purposes of illustrating the concepts of the invention and are not necessarily the only possible configuration for illustrating the invention. To facilitate understanding, identical reference numerals have been used, where possible, to designate identical elements that are common to the figures.

DETAILED DESCRIPTION OF THE INVENTION

The present invention advantageously provides a system and method for stereo logo insertion. Although the present invention is described primarily within the context of a video processor and display environment, the specific embodiments of the present invention should not be treated as limiting the scope of the invention. It will be appreciated by those skilled in the art and informed by the teachings of the present invention that the concepts of the present invention can be advantageously applied in substantially any video-based processing environment such as, but not limited to, television, transcoders, video players, image viewers, set-top-box or any software-based and/or hardware-based implementations useful for combining text with 3D content.

The functions of the various elements shown in the figures can be provided through the use of dedicated hardware as well as hardware capable of executing software in association with appropriate software. When provided by a processor, the functions can be provided by a single dedicated processor, by a single shared processor, or by a plurality of individual processors, some of which can be shared. Moreover, explicit use of the term "processor" or "controller" should not be construed to refer exclusively to hardware capable of executing software, and can implicitly include, without limitation, digital signal processor ("DSP") hardware, read-only memory ("ROM") for storing software, random access memory ("RAM"), and non-volatile storage.

Other hardware, conventional and/or custom, can also be included in the realization of the invention. For example, any switches shown in the figures are conceptual only. Their function may be carried out through the operation of program logic, through dedicated logic, through the interaction of program control and dedicated logic, or even manually, the particular technique being selectable by the implementer as more specifically understood from the context.

It will be appreciated by those skilled in the art that the block diagrams presented herein represent conceptual views of illustrative system components and/or circuitry embodying the principles of the invention. Similarly, it will be appreciated that any flow charts, flow diagrams, state transition diagrams, pseudo-code, and the like represent various processes which may be substantially represented in computer readable media and so executed by a computer or processor, whether or not such computer or processor is explicitly shown herein.

In the description which follows, it will be understood that the terms "stereo images" and "stereo views" and the terms "images" and "views" can each be used interchangeably without loss of meaning and without any intended limitation. Similarly, the terms "3D" and "stereo" may be used interchangeably. Finally, the terms "frame" and "picture" may also be used interchangeably.

Figure 1:
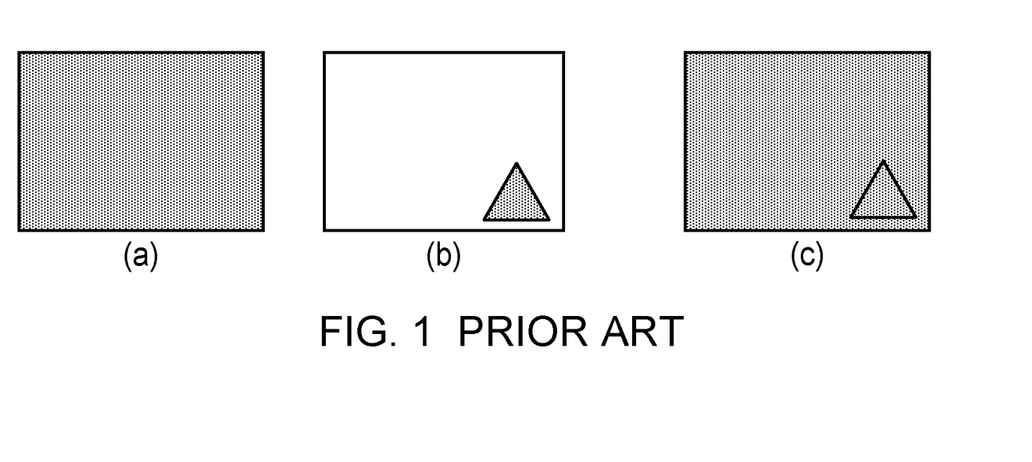
FIG. 1 depicts an exemplary set of input and output images for prior art (non-stereo) logo insertion.

As mentioned above, logo insertion for a 2D logo into 2D source or content is well known and available commercially. FIG. 1 depicts an exemplary set of input and output images for prior art (non-stereo) logo insertion. That is, FIG. 1 illustrates the operation of a conventional logo inserter commercially available today, in which an exemplary triangular logo (FIG. 1(b)) is added to the lower right corner of a source content picture (FIG. 1(a)) to form an overlaid picture (FIG. 1(c)). The logo is included in a logo frame with the logo placed is the same position in which it is to appear in the overlaid picture. The logo frame may be supplied to the logo inserter or composed within the logo inserter using the logo and other associated information. Since the source content picture and the logo are standard two-dimensional (2D) pictures, there is only a single view presented therein in contrast to stereo content in which two images or views would normally be presented in the source content picture.

In order to assist in the understanding of this problem presented by the use of 3D or stereo content, a brief description of 3D formats will be given below. Stereo 3D displays commonly support input formats where two views of a stereo picture are combined into a single combined picture. The two views usually represent left and right images or views, which are formed by dividing the spatial area of the single content picture or frame between the left and right views. Pictures formed in this manner are referred to as spatially interleaved pictures. A description and analysis of the different representations of spatially interleaved pictures can be found in a paper entitled "On Spatially Interleaved Pictures SEI Message" by D. Tian et al. presented in the Joint Video Team of ISO/IEC MPEG & ITU-T VCEG (ISO/IEC JTC1/SC29/WG11 and ITU-T SG16 Q.6) in January 2009 as Document JVT-AD017. This paper is incorporated herein by reference in its entirety.

Once a spatially-interleaved picture is formed, it can be encoded using normal 2D picture and video coding standards, such as JPEG, MPEG-2, and MPEG-4 AVC. The spatially interleaved picture can then be decomposed into two views, left and right, so that it can be displayed for presentation and viewing in stereo or 3D.

Figure 2:
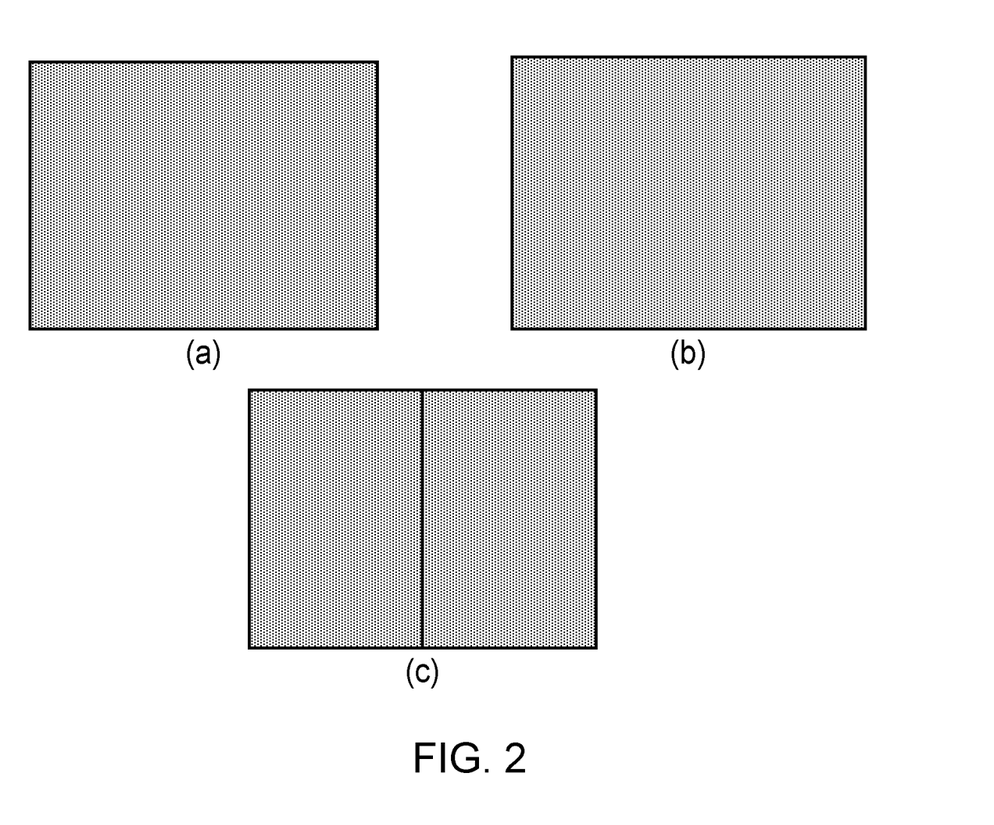
FIG. 2 depicts a set of stereo views combined into a single stereo (3D) image frame.

Several formats for spatially interleaving stereo pictures are known, including a side-by-side composition, a checkerboard pattern composition, an interlaced composition, a top-bottom composition, and a color based composition such as an anaglyph, and it is expected that additional formats will be suggested in the future. Many of these composition formats are shown simplistically in FIG. 5, while FIG. 2 illustrates a more accurate depiction of a side-by-side composition. More specifically, FIG. 2 depicts a set of stereo views combined into a single stereo (3D) image frame and FIG. 5 depicts a plurality of exemplary simplified stereo (3D) image formats and the extraction of two image views in accordance with an embodiment of the present invention.

Figure 5:
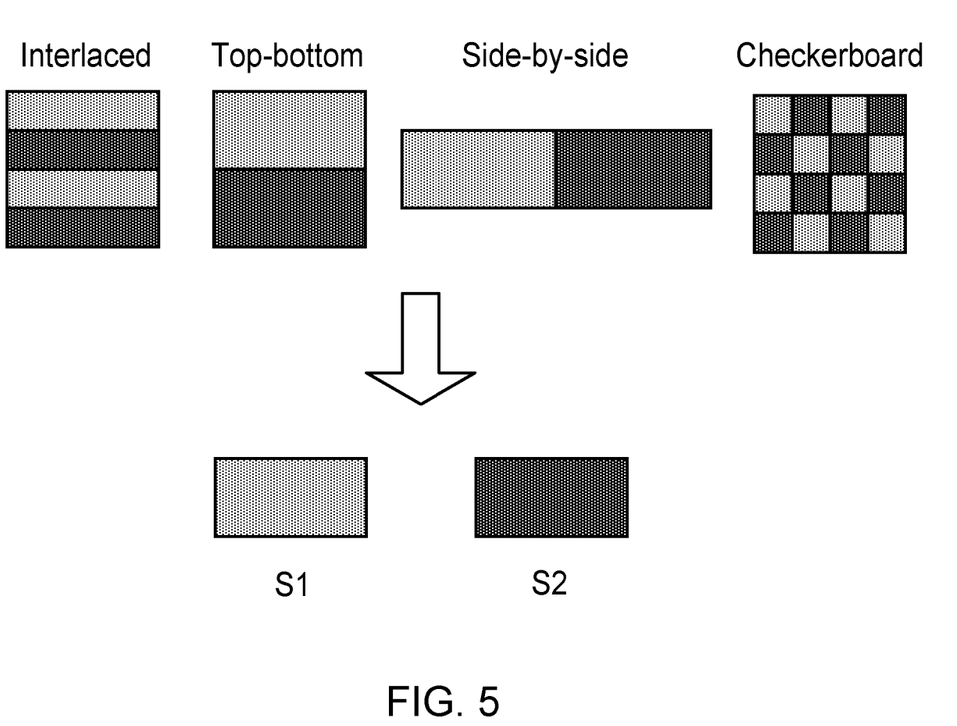
FIG. 5 depicts a plurality of exemplary simplified stereo (3D) image formats and the extraction of two image views in accordance with an embodiment of the present invention.

In FIGS. 2 and 5, one of the stereo images or stereo views of a 3D image frame is depicted in light shading, while the second image or view associated with that 3D image frame is depicted in dark shading.

As mentioned above, 3D contents include a pair of images or views initially generated as separate stereo images (or views). Each of these images can be encoded, wherein the encoding can include a down-sampling of each stereo image so that the combination of the two images fits within a normal stereo content frame size. In order to store or distribute or display the 3D image, the contents of the two stereo images, such as the left image and the right image, are combined into a single image frame. Thus, each 3D source frame represents the entire 3D image instead of using two separate stereo images, each in their own frame or file.

As previously mentioned, FIG. 5 depicts a variety of different 3D formats across the top row. The formats shown include an interlaced format, a top-bottom (also known as over-under) format, a side-by-side format, and a checkerboard pattern format. The interlaced format shown is for horizontal interlacing. The orthogonal format to horizontal interlacing, namely, vertical interlacing, can be achieved by interlacing alternating columns from each image or view instead of the alternating rows. The formats shown in this figure represent an exemplary listing rather than an exhaustive listing of all known 3D formats. In the embodiment of FIG. 5, one of the stereo images or stereo views ($S_1$) of a 3D image is depicted in light shading, while the second image or view ($S_2$) associated with that 3D image is depicted in dark shading.

In related art, the presentation of the formats has been simplified. This simplification has sacrificed accuracy in order to improve the understanding about how the left and right views are combined into the final 3D image frame. Those persons skilled in this art will appreciate that the simplification and, therefore the inaccuracy, in FIG. 5 arises because no attempt has been made to depict any down-sampling of the left and right images that would occur to make the 3D source frame have the same size regardless of the format used.

As shown in FIG. 5, when the images at the top of FIG. 5 are processed properly according to their respective formats, it is possible to extract the individual stereo images or views, $S_1$ and $S_2$, from the single 3D image at the top. These separate views can then be applied to a video processor and display for generating the original 3D picture or frame for viewing by a user. In an actual realization, it will be appreciated that the resolution of each image $S_1$ and $S_2$ is no more than half the resolution of the entire original 3D image because each image S is proportionately down-sampled in order to fit properly within the 3D stereo frame. Up-sampling by a complementary proportion permits restoration of each full size image S following extraction from the stereo 3D frame.

In order to compose the side-by-side format illustrated in FIG. 2 for a 3D image frame (FIG. 2(c)), the original left and right view pictures (i.e., FIGS. 2(b) and (c), respectively) are each down-sampled horizontally. This results in each view having half the horizontal resolution of the respective original view. The two down-sampled pictures are then placed side-by-side into a spatially interleaved picture, namely, the 3D image frame, which has the same resolution (i.e., number of pixels) as either one of the original left and right view pictures. In order to extract the two views from the 3D image frame, the spatially interleaved picture is decomposed into two separate left and right view pictures based upon the knowledge that the views are formatted side-by-side, and each of the left and right sub-pictures are up-sampled back to their original resolution. A similar process correspondingly adjusted for each format can be used for other spatially interleaved formats.

Figure 3:
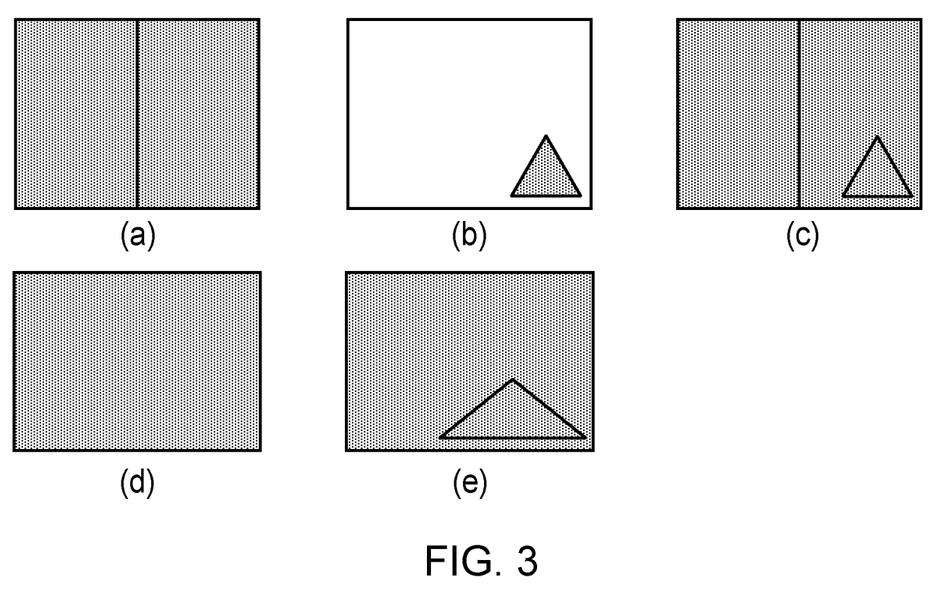
FIG. 3 depicts the logo insertion processing of a stereo image frame with a conventional logo and the subsequent extraction of the two stereo views including the logo in accordance with conventional logo insertion practices.

As discovered by the present inventors, a commercially available logo inserter is unable to perform logo insertion properly for stereo content. Moreover, the use of such a logo inserter with a spatially interleaved picture will cause undesirable effects. In order to understand these points, a simple experiment using 3D content in a spatially interleaved picture is shown in FIG. 3. That is, FIG. 3 depicts the logo insertion processing of a stereo image frame with a conventional logo and the subsequent extraction of the two stereo views including the logo in accordance with conventional logo insertion practices.

It is assumed for the depiction in FIG. 3 that the 3D content is formatted in a side-by-side spatially interleaved picture (FIG. 3(a)) of the type shown in FIG. 2. Further, it is assumed that a triangular logo (FIG. 3(b)) is to be inserted into the lower right corner of the content in combined overlaid picture (FIG. 3(c)). The logo insertion operation causes the logo to be placed over the 3D content in the conventional manner as described above. When this combined picture (FIG. 3(c)) is decomposed back into two separate views (FIGS. 3(d) and (e)) and displayed as stereo, the decomposition will have caused the logo to appear only in the right view (FIG. 3(e)) and not the left view (FIG. 3(d)). Moreover, the logo as added to the right view will be distorted in width but not in height. This problem occurs because the conventional logo inserter simply combines a 2D logo with what is assumed to be a 2D content picture. Since the full size logo is overlaid actually on a down-sampled right view in the spatially interleaved picture of FIG. 3(a). When the views are extracted for output and display and when each view is up-sampled to its full size, the logo is correspondingly increased in its width due to the up-sampling of the overlaid right view.

Figure 4:
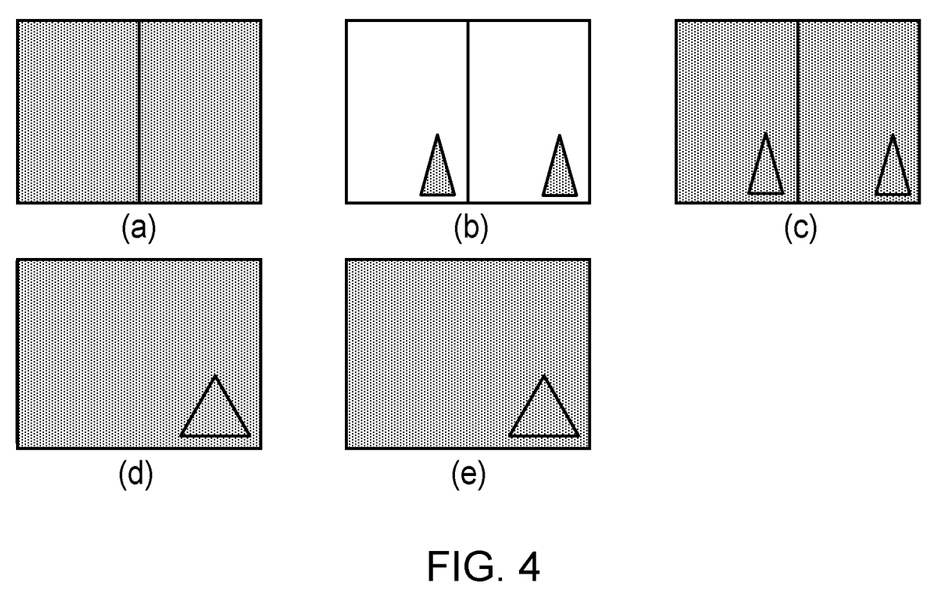
FIG. 4 depicts the logo insertion processing of a stereo image frame with a stereo logo and the subsequent extraction of the two stereo views including the logo in accordance with an embodiment of the present invention.

In order to correct these problems in accordance with the various embodiments of the present invention described herein, the stereo logo insertion technique of the present invention first detects the presence of stereo spatially interleaved pictures in the input video stream (FIG. 4(a)). More specifically, FIG. 4 depicts the logo insertion processing of a stereo image frame with a stereo logo and the subsequent extraction of the two stereo views including the logo in accordance with an embodiment of the present invention. In this way, the logo inserter can determine whether a stereo (3D) or non-stereo (e.g., 2D) picture frame is being input for logo insertion. In accordance with embodiments of the present invention, detection of spatially interleaved pictures can be performed in several different ways. For example, information such as meta-data or the like or information established with a system definition can be extracted and processed by a logo inserter. This information can accompany the picture as part of the frame formatting. Alternatively and in accordance with an alternate embodiment of the present invention, it is also possible that the logo inserter can auto-detect the presence of spatially interleaved pictures by analyzing the input video picture frames in search of certain characteristics for such spatially interleaved pictures.

With respect to the auto-detection embodiment of the present invention mentioned above, spatially interleaved pictures have edges that are seams that are detectable in certain parts of the spatially interleaved picture. A vertical seam appears between the left image and the right image in the side-by-side format as shown in FIG. 2(c). Horizontal seams occur between the images in the top-bottom format as shown in FIG. 5. Combinations of horizontal and vertical seams occur in interlaced formatting of images shown in FIG. 5. In accordance with embodiments of the present invention, edge detection can be used to detect these seams in the spatially interleaved picture. For example, in one embodiment of the present invention, a Sobel filter or the like can be used for such edge detection.

In an alternative embodiment of the present invention for auto-detection, view correlation can be used to detect the spatial interleaving mode as a side-by-side, over-under, line-interleaved, or checkerboard pattern. For example, for each interleaving mode, the views can be extracted according to the particular interleaving technique and the mean square error (MSE) between the two views can be computed. After the MSE's for each expected interleaving technique have been collected, a decision of the most likely interleaving technique can be made by selecting as the actual interleaving mode the technique that produced the lowest MSE. This process can be refined to include a decision that the format is 2D by comparing the all the computed MSE's to a predetermined threshold and, if the threshold is exceeded by the MSE's for all the modes, then the content picture can be identified as 2D only.

Techniques for recognizing the presence and format of a 3D image suitable for realization of the auto-detection feature herein have been presented in detail in several co-pending patent applications assigned to the common assignee hereof. The co-pending applications, which are incorporated by reference herein their entirety, include: application Ser. No. 13/514,681 entitled, "Method and Apparatus For Distinguishing A 3D Image From A 2D Image And For Identifying The Presence Of A 3D Image Format By Image Difference Determination" and, application Ser. No. 13/514,622 entitled, "Method For Distinguishing A 3D Image From A 2D Image And For Identifying The Presence Of A 3D Image Format By Feature Correspondence Determination". In the first related patent application identified above, the method disclosed uses a technique relying on image difference to distinguish a 3D image from a 2D image. In the latter related patent application identified above, the method disclosed therein relies on feature correspondence to distinguish a 3D image from a 2D image. Feature correspondence based methods detect features and establish a one-by-one correspondence between detected features. In contrast to feature correspondence, image difference based methods do not rely on features for proper identification and operation.

If, in accordance with the various embodiments of the present invention, the logo inserter detects that the input video contains stereo spatial interleaving, the logo is formatted into a spatially interleaved logo picture having a spatial interleaving format identical to the spatial interleaving format identified for the input video picture frames (FIG. 4(b)). In such an embodiment of the present invention, the logo is placed in each of the two views and then it is subjected to the appropriate amount of down-sampling. For the example shown in FIG. 4, the triangular logo picture would be down-sampled horizontally to achieve the proper side-by-side spatial interleaving. At this point, the input video and spatially interleaved logo picture can be processed using a conventional logo insertion technique to create a spatially interleaved overlaid picture as shown in FIG. 4. That is, the properly formatted logo picture in FIG. 4(b) can be combined in the conventional manner with the spatially interleaved source picture in FIG. 4(a) to generate the overlaid logo-inserted picture in FIG. 4(c). From the figure, it is clear that the down-sampled logo appears in each down-sampled view. Of course, the appearance of the various pictures in FIGS. 4(a)-(c) would be correspondingly changed based on the actual spatial interleaving technique that is used and detected.

When the spatially interleaved overlaid picture from FIG. 4(c) is processed for display, the logo will be accurately represented in the left and right stereo views. For the example shown in FIG. 4, the left and right views are extracted from the side-by-side formatting and up-sampled to the correct picture frame size (i.e., the same size as the original video frame in FIG. 4(a)). At this point, the left view in FIG. 4(d) and the right view in FIG. 4(e) are suitable for stereo display.

In the exemplary embodiment described above, the logo is shown as being inserted in substantially the same position for each of the two images. It is contemplated that the logo position can be different in each of the two images in order to change the depth of the logo when it is viewed with the associated stereo content. Moreover, it is contemplated that the depth of the logo can be held at a predetermined constant value from one frame to the next or, in alternate embodiments of the present invention, can be varied according to a predetermined pattern of variation or according to the depth of the image over which the logo is being inserted, for example. In various embodiments of the present invention, transparency, size, color, motion, and other parameters of the logo can also be determined and/or varied over time or in accordance with properties of the image over which the logo is being inserted.

While logo insertion has been describe as being performed substantially by a logo inserter device above, it is contemplated that logo insertion can be performed by many different devices, such as a set-top box or a DVD player or the like, prior to display of the stereo images.

Figure 6:
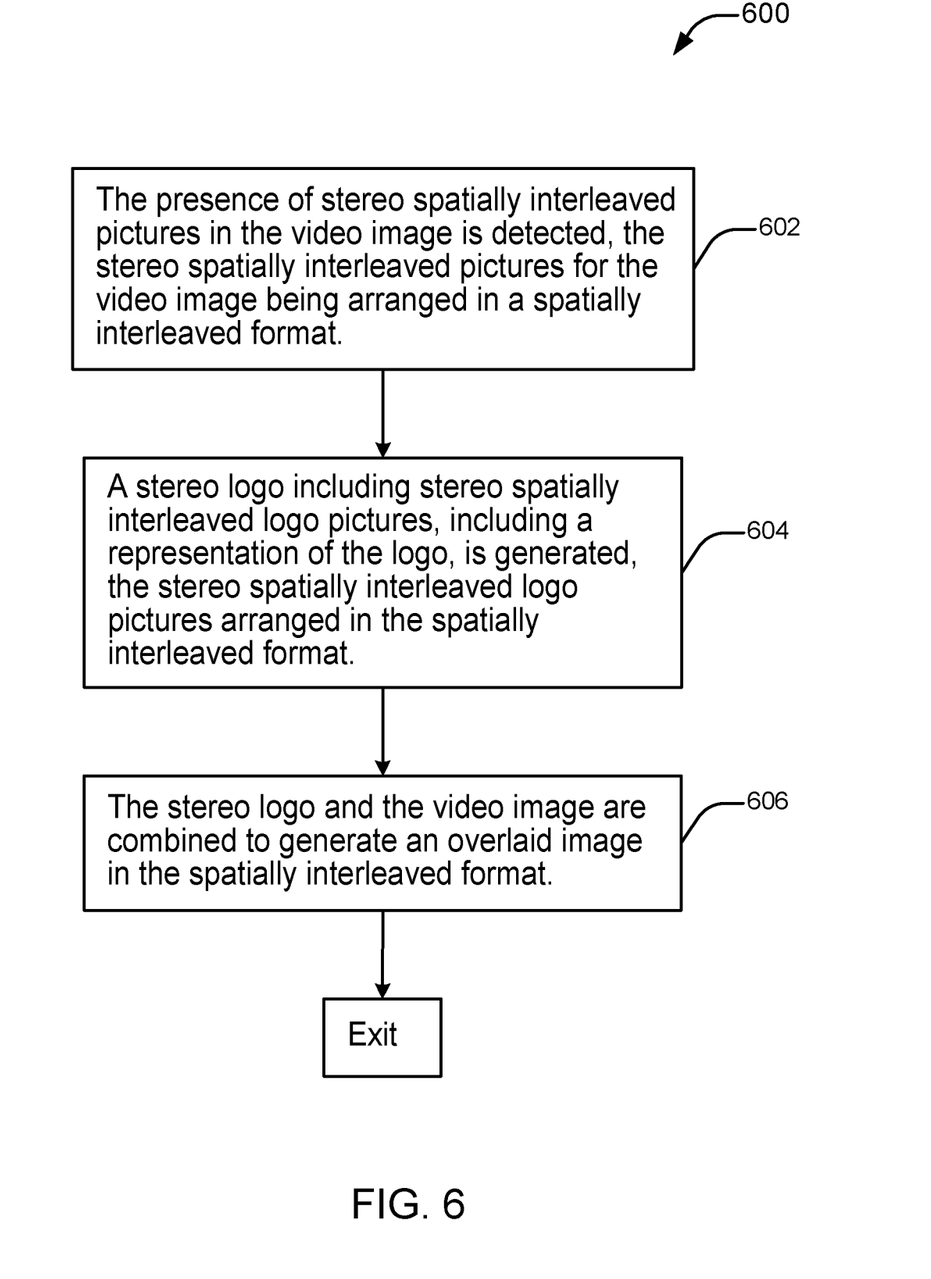
FIG. 6 depicts a flow diagram of a method for inserting a logo into a video image to generate an overlaid image in accordance with an embodiment of the present invention.

FIG. 6 depicts a flow diagram of a method for inserting a logo into a video image to generate an overlaid image in accordance with an embodiment of the present invention.

The method 600 of FIG. 6 begins at step 602 during which the presence of stereo spatially interleaved pictures in the video image is detected, the stereo spatially interleaved pictures for the video image being arranged in a spatially interleaved format. The method 600 then proceeds to step 604.

At step 604, a stereo logo including stereo spatially interleaved logo pictures, including a representation of the logo, is generated, the stereo spatially interleaved logo pictures arranged in the spatially interleaved format. The method 600 then proceeds to step 606.

At step 606, the stereo logo and the video image are combined to generate the overlaid image in the spatially interleaved format. The method 600 can then be exited.

Having described various embodiments for a method for stereo logo insertion (which embodiments are intended to be illustrative and not limiting), it is noted that modifications and variations can be made by persons skilled in the art in light of the above teachings. It is therefore to be understood that changes may be made in the particular embodiments of the invention disclosed which are within the scope and spirit of the invention. While the forgoing is directed to various embodiments of the present invention, other and further embodiments of the invention may be devised without departing from the basic scope thereof.

The invention claimed is:

1. A method for inserting a logo into a video image to generate an overlaid image, the method comprising:
   detecting a presence of stereo spatially interleaved pictures in the video image, the stereo spatially interleaved pictures for the video image being arranged in a spatially interleaved format;
   auto detecting the interleaved format by analyzing a plurality of selective characteristics in said images and determining if said characteristics exceed a value that identifies them as stereo images;
   generating a stereo logo comprising stereo spatially interleaved logo pictures including a representation of the logo, the stereo spatially interleaved logo pictures arranged in said detected spatially interleaved format; and
   combining the stereo logo and the video image to generate the overlaid image in the detected spatially interleaved format.

2. The method of claim 1 comprising:
   auto-detecting the spatially interleaved format by detecting at least one seam in said video image.

3. The method of claim 2, wherein the at least one seam includes a horizontal seam and wherein said spatially interleaved format includes one of a top-bottom format, an interlaced format and a checkerboard format.

4. The method of claim 2, wherein the at least one seam includes a vertical seam and wherein said spatially interleaved format includes one of a side-by-side format, an interlaced format and a checkerboard format.

5. The method of claim 1, wherein said analysis is done using a view correlation technique and said generating the stereo logo further comprises:
   down sampling said logo to produce each of the stereo spatially interleaved pictures, said down-sampling being based on the spatially interleaved format.

6. The method of claim 5, wherein said down-sampling is a horizontal down-sampling and wherein said spatially interleaved format includes one of a side-by-side format, an interlaced format and a checkerboard format.

7. The method of claim 5, wherein said down-sampling is a vertical down-sampling and wherein said spatially interleaved format includes one of a top-bottom, an interlaced format and a checkerboard format.

8. The method of claim 1, wherein said generating the stereo logo further comprises:
   positioning said logo at an identical location in each of the stereo spatially interleaved pictures.

9. The method of claim 1, wherein said generating the stereo logo further comprises:
   positioning said logo in a different location in each of the stereo spatially interleaved pictures.

10. The method of claim 1, wherein said detecting further comprises: identifying said spatially interleaved format for said video image.

\* \* \* \* \*